US012300022B2

United States Patent
Dong et al.

(10) Patent No.: US 12,300,022 B2
(45) Date of Patent: *May 13, 2025

(54) METHOD, SERVER AND COMMUNICATION SYSTEM OF VERIFYING USER FOR TRANSPORTATION PURPOSES

(71) Applicant: GRABTAXI HOLDINGS PTE. LTD., Singapore (SG)

(72) Inventors: Cheuk Lun Dong, Redmond, WA (US); Chun Tung Wong, Seattle, WA (US); Munirul Abedin, Sammamish, WA (US); Yee Won Nyon, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,310

(22) Filed: May 30, 2024

(65) Prior Publication Data

US 2024/0362949 A1 Oct. 31, 2024

Related U.S. Application Data

(63) Continuation of application No. 17/619,935, filed as application No. PCT/SG2020/050052 on Feb. 4, 2020, now Pat. No. 12,033,428.

(51) Int. Cl.
*G06V 40/16* (2022.01)
*G06F 16/51* (2019.01)
(Continued)

(52) U.S. Cl.
CPC ............ *G06V 40/161* (2022.01); *G06F 16/51* (2019.01); *G06F 16/535* (2019.01); *G06V 40/166* (2022.01); *G06V 40/40* (2022.01)

(58) Field of Classification Search
None
See application file for complete search history.

(56) References Cited

U.S. PATENT DOCUMENTS 9,202,105 B1   12/2015  Wang et al.
12,033,428 B2 *  7/2024  Dong .................... G06F 3/012
(Continued)

FOREIGN PATENT DOCUMENTS

CN       105005779 A    10/2015
CN       106295288 A     1/2017
(Continued)

OTHER PUBLICATIONS

Information Disclosure Statement dated Feb. 23, 2022 which was filed in connection with U.S. Appl. No. 17/619,935.
(Continued)

*Primary Examiner* — Bernard Krasnic
(74) *Attorney, Agent, or Firm* — Buckley, Maschoff & Talwalkar LLC (57) ABSTRACT

A method of verifying a user for transportation purposes is disclosed. The method may include using a communication apparatus to detect a face of the user. The method may include using the communication apparatus to instruct the user to perform a specific action, to validate that the specific action is performed by the user, to extract a frame from the specific action to use as an image, to obtain image parameters from the frame and to use the communication apparatus to send the image to a server for the server to determine whether the image is a genuine face by comparing the image parameters of the image with parameters in a database to obtain a comparison result and to use the comparison result to determine if the user should be verified.

21 Claims, 4 Drawing Sheets

(51) Int. Cl.
*G06F 16/535* (2019.01)
*G06V 40/40* (2022.01)

(56) References Cited

U.S. PATENT DOCUMENTS

| | | |
|---|---|---|
| 2016/0062456 A1 | 3/2016 | Wang et al. |
| 2016/0071111 A1 | 3/2016 | Wang et al. |
| 2017/0180362 A1 | 6/2017 | Du |
| 2019/0244390 A1 | 8/2019 | Doublet et al. |
| 2020/0219043 A1 | 7/2020 | Talbot et al. |

FOREIGN PATENT DOCUMENTS

| | | | |
|---|---|---|---|
| CN | 109299643 A | | 2/2019 |
| CN | 109829370 A | * | 5/2019 |
| CN | 110532744 A | | 12/2019 |
| CN | 110738607 A | | 1/2020 |
| WO | 2018192406 A1 | | 10/2018 |

OTHER PUBLICATIONS

How to verify using selfie httos://heb.grah.corn/nassermer/en--sg/360002063868 - Passenger; accessed Aug. 21, 2019; 3 pp.
International Preliminary Report on Patentability in Application No. PCT/SG2020/050052 dated Dec. 2, 2021, 4 DD.
International Search Report dated Apr. 6, 2020 with was issued in connection with PCT/SG2020/050052.
Written Opinion dated Apr. 6, 2020 with was issued in connection with PCT/SG2020/050052.
Information Disclosure Statement dated Oct. 28, 2022 which was filed in connection with U.S. Appl. No. 17/619,935.
Chinese Office Action (Application No. 202080045402.7) mailed Aug. 12, 2022 (26pages).
892 Form dated Jan. 19, 2023 which was issued in connection with U.S. Appl. No. 17/619,935.

* cited by examiner

METHOD, SERVER AND COMMUNICATION SYSTEM OF VERIFYING USER FOR TRANSPORTATION PURPOSES

This application is a continuation of, and claims benefit of and priority to, U.S. patent application Ser. No. 17/619,935 filed on Dec. 16, 2021 which is a US National Stage Application under 35 USC 371 claiming benefit of and priority to International Application No. PCT/SG2020/050052, filed on Feb. 4, 2020, each of which is incorporated by reference herein in their entirety.

TECHNICAL FIELD

Various aspects of this disclosure relate to a method of verifying a user for transportation purposes. Various aspects of this disclosure relate to a server configured to verify a user for transportation purposes. Various aspects of this disclosure relate to a communication system configured to verify a user for transportation purposes. Various aspects of this disclosure relate to a non-transitory computer-readable medium storing computer executable code for verifying a user for transportation purposes. Various aspects of this disclosure relate to a computer executable code for verifying a user for transportation purposes.

BACKGROUND

Static photos are traditionally used by application providers to validate application users. This generally involves the user taking a static selfie photo of themselves to be used for record or to update their profile photos. These photos are also used to conduct safety and security checks. However, there are users who do not upload a genuine selfie photo of their face. For example, their profile picture may be from a photo, a video held up in front of a camera or the user may have covered their face using a mask. Since some users sign up for an account for transportation services (e.g., ride-hailing services) with the intent of committing a crime (e.g. robbing the driver, or having a "free ride"), there may be little or no helpful information to assist authorities in their investigation.

SUMMARY

Therefore, there may be a need to provide an accurate and improved method of verification. There may also be a need to determine with higher accuracy whether a static profile photo of a user is a genuine face.

Various embodiments may provide a method of verifying a user for transportation purposes. The method may include using a communication apparatus to detect a face of the user. The method may include using the communication apparatus to instruct the user to perform a specific action, to validate that the specific action is performed by the user, to extract a frame from the specific action to use as an image, obtain image parameters from the frame and to use the communication apparatus to send the image to a server for the server to determine whether the image is a genuine face by comparing the image parameters of the image with parameters in a database to obtain a comparison result and to use the comparison result to determine if the user should be verified.

According to various embodiments, the database may include a threshold value. The method disclosed according to various embodiments may further include comparing the comparison result with the threshold value to obtain a verification result. The method may also include using the verification result to determine if the user should be verified.

According to various embodiments, determining whether the image is a genuine face may include checking whether the image is from a photo or a video.

According to various embodiments, the specific action may be a head action.

According to various embodiments, validating that the specific action 1s performed by the user may include capturing multiple frames from the specific action.

According to various embodiments, validating that the specific action 1s performed by the user may include comparing a position of the face of the user in each frame of the multiple frames to determine if the specific action is performed.

According to various embodiments, prior to the step of detecting the face of the user, the server may conduct a preliminary check on the user.

According to various embodiments, the preliminary check may include checking if the user is a new user or if the user has completed other forms of verification.

According to various embodiments, the method may further include prior to the step of instructing the user to perform the specific action, a step of instructing the user to position the face of the user in a specific position.

According to various embodiments, the image parameters may be obtained before sending the image to the server, and the method may further include sending the image parameters to the server Various embodiments may provide a server configured to verify a user for transportation purposes. The server may include a database and a processor coupled to the database. The processor may be configured to receive an image from a communication apparatus, wherein the image is obtained when the communication apparatus detects a face of the user, instructs the user to perform a specific action, validates that the specific action is performed by the user, and extracts a frame from the specific action to use as the image. The processor may be configured to obtain image parameters from the frame. The processor may be configured to determine whether the image is a genuine face by comparing the image parameters of the image with parameters in the database to obtain a comparison result. The processor may also be configured to use the comparison result to determine if the user should be verified.

According to various embodiments, the database may include a threshold value. The comparison result may be compared with the threshold value to obtain a verification result. The verification result may be used to determine if the user should be verified.

According to various embodiments, determining whether the image is a genuine face may include checking whether the image is from a photo or a video.

According to various embodiments, the server may conduct a preliminary check on the user prior to receiving the image from the communication apparatus.

According to various embodiments, the preliminary check may include checking if the user is a new user or if the user has completed other forms of verification.

Various embodiments may provide a communication system configured to verify a user for transportation purposes. The communication system may include a server and a communication apparatus in communication with the server. The communication apparatus may include a memory and a processor in communication with the memory. The processor may be configured to detect a face of the user, instruct the user to perform a specific action, validate that the specific action is performed by the user and extract a frame from the specific action to use as an image. The processor may be configured to obtain image parameters from the frame. The processor may be configured to send the image to the server for the server to determine whether the image is a genuine face by comparing the image parameters of the image with parameters in a database to obtain a comparison result and to use the comparison result to determine if the user should be verified.

According to various embodiments, validating that the specific action 1s performed by the user may include capturing multiple frames from the specific action.

According to various embodiments, validating that the specific action 1s performed by the user may include comparing a position of the face of the user in each frame of the multiple frames to determine if the specific action is performed.

According to various embodiments, the processor may be further configured to instruct the user to position the face of the user in a specific position prior to instructing the user to perform the specific action.

Various embodiments may provide a non-transitory computer-readable medium storing computer executable code including instructions for verifying a user for transportation purposes according to the various embodiments disclosed herein.

Various embodiments may provide a computer executable code including instructions for verifying a user for transportation purposes according to the various embodiments disclosed herein.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of a method may be analogously valid for the system and vice-versa. Similarly, embodiments described in the context of a system may be analogously valid for a computer program, and vice-versa. Also, embodiments described in the context of a method may be analogously valid for a computer program, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

Figure 1:
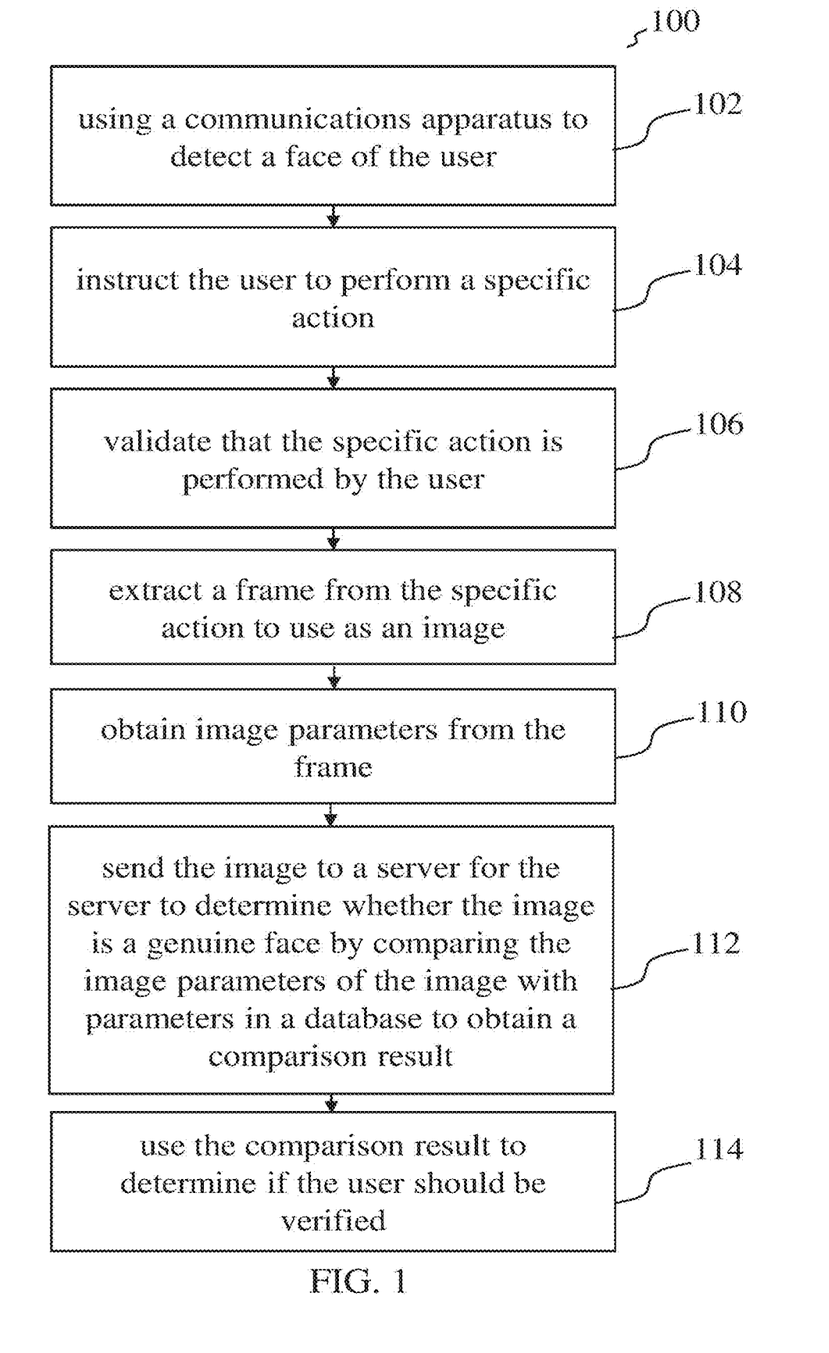
FIG. 1 shows a flowchart of a method 100 according to various embodiments.

FIG. 1 shows a flowchart of a method 100 according to various embodiments.

According to various embodiments, the method 100 of verifying a user for transportation purposes may be provided. In some embodiments, the method 100 may include a step 102 of using a communication apparatus to detect a face of the user. The method 100 may also include a step 104 of using the communication apparatus to instruct the user to perform a specific action. The method 100 may include a step 106 to validate that the specific action is performed by the user. The method 100 may also include a step 108 to extract a frame from the specific action to use as an image. The method 100 may also include a step 110 to obtain image parameters from the frame. In some embodiments, the method 100 may include a step 112 to use the communication apparatus to send the image to a server for the server to determine whether the image is a genuine face by comparing the image parameters of the image with parameters in a database to obtain a comparison result. The method 100 may also include a step 114 to use the comparison result to determine if the user should be verified.

Steps 102 to 114 are shown in a specific order, however other arrangements are possible, for example, in some embodiments, step 110 may be carried out after step 112. Steps may also be combined in some cases. Any suitable order of steps 102 to 114 may be used.

Figure 2:
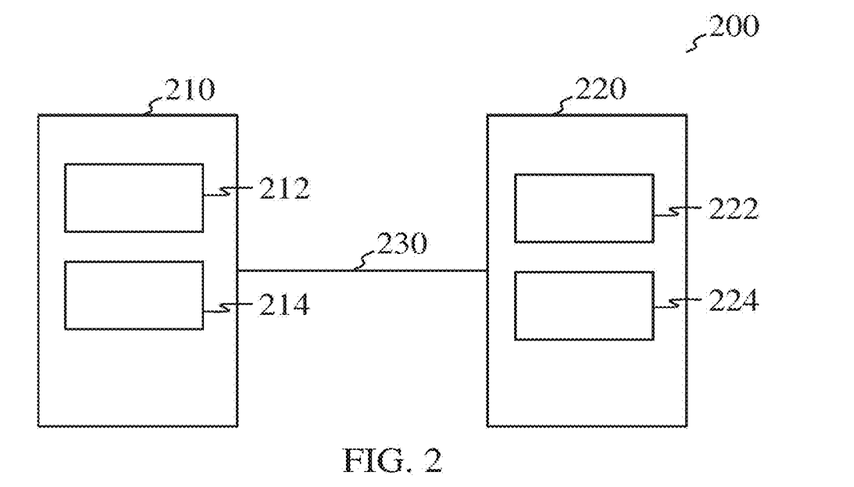
FIG. 2 shows a schematic diagram of a communication system 200 according to various embodiments.

FIG. 2 shows a schematic diagram of a communication system 200 according to various embodiments.

According to various embodiments, the communication system 200 may include a communication apparatus 210 and a server 220. The communication apparatus 210 and the server 220 are in communication with each other through communication link 230. Even though communication link 230 is shown as a line connecting the communication apparatus 210 and the server 220, the communication apparatus 210 and the server 220 may not be physically connected to each other, for example through a cable. Instead, the communication apparatus 210 and the server 220 may be able to communicate wirelessly through internet communication protocols or through a mobile cellular commutations network.

In various embodiments, the communication apparatus 210 may include a memory 212 and a processor 214. The memory 212 may include computer executable code defining the functionality the communication apparatus 210 carries out under control of the processor 214. The memory 212 may include or may be a computer program product such as a non-transitory computer-readable medium. The communication apparatus 210 may also include an input and/or output module allowing the communication apparatus 210 to communicate over the communication link 230. The communication apparatus 210 may also include a user interface for the user to control the communication apparatus 210. The user interface may be a touch panel display. The user interface may include a display monitor, a keyboard or buttons.

In various embodiments, the server 220 may be a single server as illustrated schematically in FIG. 2, or have the functionality performed by the server 220 distributed across multiple server components. The server 220 may include a server processor 222 and a database 224. The server 220 may also include a memory. The memory and the database may be one component or may be separate components. The memory of the server may include computer executable code defining the functionality the server 220 carries out under control of the server processor 222. The database 224 may include or may be a computer program product such as a non-transitory computer-readable medium. The server 220 may also include an input and/or output module allowing the server 220 to communicate over the communication link 230. The server 220 may also include user interface for user control of the server 220. The user interface may include, for example, computing peripheral devices such as display monitors and computer keyboards.

In various embodiments, the processor 214 of the communication apparatus 210 may be configured to detect a face of the user. The processor 214 may also be configured to instruct the user to perform a specific action. The processor 214 may also be configured to validate that the specific action is performed by the user. The processor 214 may also be configured to extract a frame from the specific action to use as an image. The processor 214 may be configured to obtain image parameters from the frame. Alternatively, the image parameters from the frame may be obtained by the server processor 222 of the server 220.

In various embodiments, validating that the specific action is performed by the user may include capturing multiple frames from the specific action. The processor 214 may capture multiple frames from the specific action at specific time intervals. The number of multiple frames may be between 3 to 5 frames. The specific time intervals may be 5 milliseconds between each frame.

According to various embodiments, validating that the specific action Is performed by the user may include comparing a position of the face of the user in each frame of the multiple frames to determine if the specific action is performed. For example, if the specific action is a head nod, the processor 214 may compare the position of the face of the user in the first frame to the position of the face of the user in the second frame to determine if the specific action is performed. For example, if the position of the face of the user in the second frame is lower than the position of the face of the user in the first frame, there is a higher likelihood that the specific action is performed. More frames can be compared for more accurate results.

According to various embodiments, the processor 214 may be further configured to instruct the user to position the face of the user in a specific position prior to instructing the user to perform the specific action. In various embodiments, the instructions may include instructing the user to position the face of the user at the center of the display screen of the communication apparatus. The instructions may also include instructing the user to position the face of the user at a specific distance from a camera of the communication apparatus, for example instructing the user to move closer or further away from the camera. The instructions may also include instructing the user to move to a brighter location in the event that the face of the user appears too dark on the display screen or to a dimmer location if the user appears too bright on the display screen. Once the user is properly positioned in the specific position, the processor 214 may then instruct the user to perform the specific action.

According to various embodiments, the processor 214 of the communication apparatus 210 may be configured to send the image to the server 220 for the server 220 to determine whether the image is a genuine face by comparing the image parameters of the image with parameters in a database to obtain a comparison result and to use the comparison result to determine if the user should be verified.

In various embodiments, the image parameters of the image may be in the form of hashes. The hashes may be stored in a hash table. The image parameters of the image may include the locations of facial features such as eyes, nose and mouth of the user on the face and/or distances of facial features such as eyes, nose and mouth of the user from each other. The image parameters may be obtained and/or determined from the frame by the processor 214 of the communication apparatus 210. The image parameters may obtained before sending the image to the server 220. The image parameters may be sent to the server together with the image. Alternatively, the image parameters may be obtained and/or determined by the server processor 222 of the server 220 from the frame sent to the server 220.

In various embodiments, the parameters in the database 224 of the server 220 may include common locations of facial features and/or common distances of facial features from each other.

In various embodiments, the database 224 may include a threshold value. The comparison result may be compared with the threshold value to obtain a verification result. The verification result may be used to determine if the user should be verified. For example, if the comparison result is more than the threshold value, the verification result may indicate that the user should be verified. If the comparison result is less than the threshold value, the verification result may indicate that the user should not be verified. If the comparison result is equal to the threshold value, the verification result may indicate that the user should be verified or indicate that the user should not be verified depending on how the server 220 has been programmed.

In various embodiments, determining whether the image is a genuine face may include checking whether the image is from a photo or a video. Determining whether the image is a genuine face may also include checking whether the user has covered the face with a mask or a cloth or by any other suitable means.

In various embodiments, the server 220 may conduct a preliminary check on the user. The preliminary check may be conducted before the verification process begins. The preliminary check may include checking a risk level of the user. The preliminary check may be based on specific characteristics of the user. For example, checking whether the user is a new user or if the user has not taken a transportation ride within a specified number of days (e.g., 30 days). The preliminary check may include checking if the user has completed other forms of verification. Other forms of verification may include checking if the user has added his or her credit card details and/or whether the user has linked his or her social media accounts.

In various embodiments, when the user has been verified, the user may proceed to book transportation services. The static selfie image may be stored in the server for future reference.

According to various embodiments, a computer program product may store the computer executable code including instructions for verifying a user for transportation purposes according to the various embodiments. The computer executable code may be a computer program. The computer program product may be a non-transitory computer-readable medium. The computer program product may be in or may be the communication system and/or the communication apparatus and/or the server.

Figure 3A:
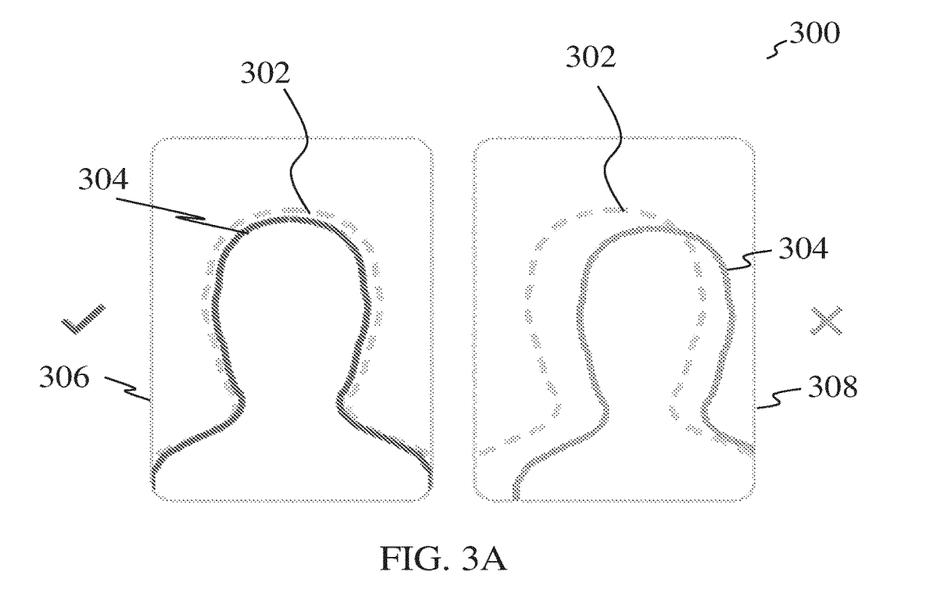
FIG. 3A shows a diagram 300 showing a communication apparatus instructing the user to position the face of the user in a specific position according to various embodiments.

FIG. 3A shows a diagram 300 showing a communication apparatus instructing the user to position the face of the user in a specific position according to various embodiments.

Figure 3B:
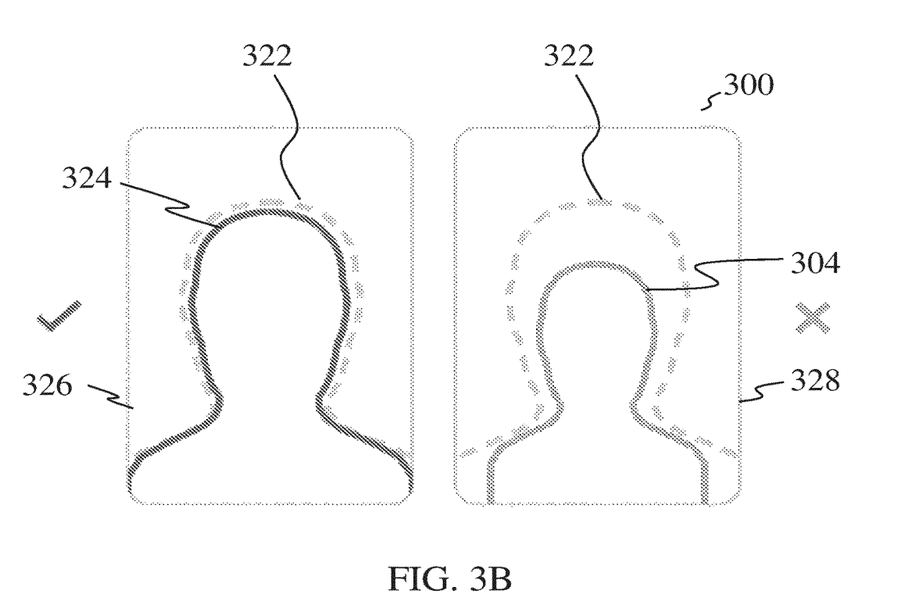
FIG. 3B shows a diagram 320 showing a communication apparatus instructing the user to position the face of the user in a specific position according to various embodiments.

Diagram 300 shows an example of centering the face of the user on a display screen of the communication apparatus. As shown in diagram 300 of FIG. 3A, a line 302 which is depicted in dashed lines indicates the position the user is supposed to position his or her head in. Line 304 depicts the outline of the face of the user. As shown in diagram 306, when the user positions his or her face within dashed line 302, the communication apparatus would indicate to the user that his or her face is in the correct location. As shown in diagram 308, when the user positions his or her face outside of dashed line 302, the communication apparatus would indicate to the user that his or her face is not in the correct location. FIG. 3B shows a diagram 320 showing a communication apparatus instructing the user to position the face of the user in a specific position according to various embodiments.

Diagram 320 shows an example of instructing the user to position the face of the user at a specific distance from a camera of the communication apparatus. As shown in diagram 320 of FIG. 3B, a line 322 which is depicted in dashed lines indicates the distance from the camera that the user is supposed to position his or her head in. Line 324 depicts the outline of the face of the user. As shown in diagram 326, when the user positions his or her face at a correct distance from dashed line 322, the communication apparatus would indicate to the user that his or her face is at the correct distance. As shown in diagram 328, when the user positions his or her face too far from dashed line 322, the communication apparatus would indicate to the user that his or her face is not at the correct distance.

Figure 3C:
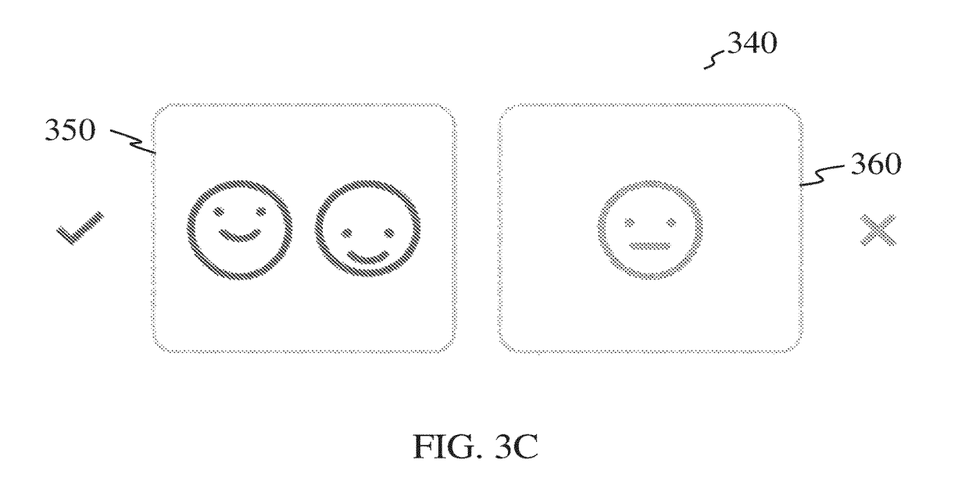
FIG. 3C shows a diagram 340 showing a communication apparatus instructing the user to perform a specific action according to various embodiments.

FIG. 3C shows a diagram 340 showing a communication apparatus instructing the user to perform a specific action according to various embodiments.

As shown in diagram 350 of FIG. 3C, when the user performs the specific action, for example, a head nod, the communication apparatus would indicate to the user that the correct action is performed. As shown in diagram 360 of FIG. 3C, when the user does not perform the specific action or performs a different action, the communication apparatus would indicate to the user that the correct action is not performed.

Figure 4:
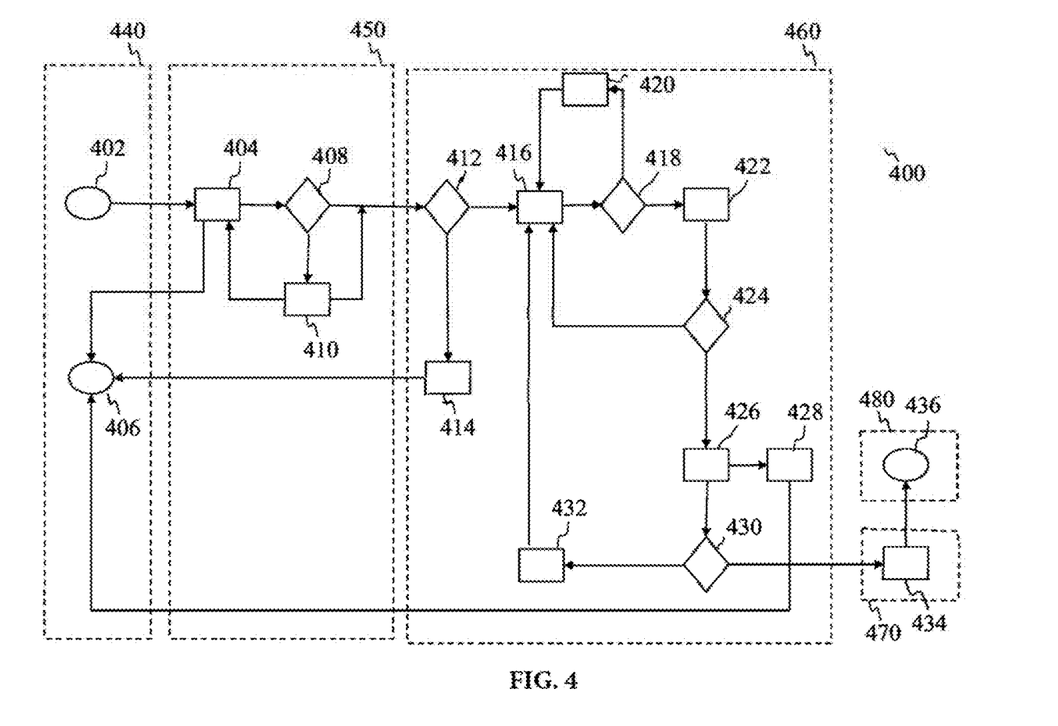
FIG. 4 shows a flowchart of a method 400 according to various embodiments.

FIG. 4 shows a flowchart of an example 400 of verifying a user for transportation purposes according to various embodiments.

In this example, the user starts off at a user verification page 440 displayed on the communication apparatus. At step 402, the user chooses a selfie option on the user verification page 440.

After which, the user proceeds to step 404, where the user is directed to a terms and conditions (T&C) page 450 displayed on the communication apparatus. The user sees the terms and conditions and a clear explanation of how the selfie of the user will be handled by the transport service provider. If the user clicks the "back" button on the T&C page 450, the user proceeds to step 406, where the user is directed back to the user verification page 440 displayed on the communication apparatus. If the user agrees to the terms and conditions at step 404, the user proceeds to step 408.

At step 408, the communication apparatus checks to see if the user has granted camera access to the transport application previously. If the user has not granted camera access to the transport application, the user proceeds to step 410. At step 410, the user sees a dialog box displayed on the communication apparatus requesting for camera access. If the user denies camera access, the user is redirected back to step 404, where the terms and conditions (T&C) step 410, the user proceeds to step 412. Alternatively, at step 408, if the user has already granted camera access previously, the user proceeds to step 412 from step 408.

At step 412, the user is directed to a selfie taking interface 460 displayed on the communication apparatus. The communication apparatus checks whether there is any sensor error from the user's communication apparatus. If there is a sensor error, the user proceeds to step 414, where the user sees a dialog box displayed on the communication apparatus displaying a sensor error message and a button to clear the error message. When the user presses the button, the user proceeds to step 406, where the user is redirected back to the user verification page 440 displayed on the communication apparatus. Alternatively, at step 412, if there is no sensor error, the user proceeds to step 416.

At step 416, instructions to take a live selfie is displayed on the selfie taking interface 460 displayed on the communication apparatus. The instructions displayed may include instructing the user to position the face of the user in a specific position. The instructions displayed may also include instructing the user to perform a specific action. For example, the specific action may be a head action like a head nod or a head shake. In various embodiments, the instructions displayed may be similar to the instructions disclosed in FIGS. 1, 2 and 3A-3C. The communication apparatus may validate that the specific action is performed by the user. The communication apparatus may validate that the specific action is performed by the user by capturing multiple frames from the specific action. The communication apparatus may compare a position of the face of the user in each frame of the multiple frames to determine if the specific action is performed.

At step 418, the communication apparatus takes a frame of the user performing the specific action. The communication apparatus checks whether any face is detected within a prescribed time. For example, the prescribed time may be between 10 to 20 seconds. If no face is detected within the prescribed time, the user proceeds to step 420, where the user sees a dialog box displayed on the communication apparatus displaying a timeout message and a button to clear the timeout message and to try the live selfie again. When the user presses the button, the user is redirected back to step 416, where instructions to take a live selfie is displayed on the selfie taking interface 460 displayed on the communication apparatus. Alternatively, at step 418, if a face is detected within the prescribed time, the user proceeds to step 422, where the frame of the user performing the specific action is displayed as the static selfie image on the communication apparatus. At step 424, the user is presented with options to submit the static selfie image or to retake the static selfie image. If the user wishes to retake the static selfie image, the user is redirected to step 416 where instructions to take a live selfie is displayed on the selfie taking interface 460 displayed on the communication apparatus. Alternatively, at step 424, if the user submits the static selfie image, the static selfie image is sent to a server and the user proceeds to step 426.

At step 426, the server conducts a check to determine whether the static selfie image is a genuine face. This check conducted by the server is not visible to the user. When determining whether the image is a genuine face may include checking whether the image is from a photo or a video. The server may compare image parameters of the static selfie image with parameters in the database to obtain a comparison result. The server may use the comparison result to determine if the user should be verified. In various embodiments, the database may include a threshold value. The server may compare the comparison result with the threshold value to obtain a verification result. The server may use the verification result to determine if the user should be verified.

If the server determines that there is a server error, the method proceeds to step 406, where the user is redirected back to the user verification page 440 displayed on the communication apparatus. If the server determines that the static selfie image does not pass the check, the method proceeds to step 432, where the user sees a dialog box displayed on the communication apparatus displaying a message indicating that the static selfie image did not pass the check and provides a button to clear the message and to try the live selfie again. When the user presses the button, the user is redirected back to step 416, where instructions to take a live selfie is displayed on the selfie taking interface 460 displayed on the communication apparatus. If the server determines that the static selfie image passes the check, the method proceeds to step 434, where the user is directed to a success screen 470. When the user taps the success screen 470 or when a pre-determined time (e.g., 2 seconds) has passed, the user proceeds to step 436, where the user is directed to a booking screen 480. The verification process is completed, and the user can proceed to book transportation services, for example, ride-hailing services. The static selfie image may be stored in the server for future reference.

Steps 402 to 436 are shown in a specific flow, however other configurations are possible, for example, in some embodiments, step 404 may be optional as the user may have previously agreed to the terms and conditions. As another example, steps 422 and/or steps 424 may be optional, the server may proceed from step 418 to step 426 without giving the user the option of checking, submitting and/or retaking the static selfie image. As a further example, step 436 may also be optional. Instead of a booking screen, the user may be directed to a screen for other purposes (e.g., other forms of services that requires user verification). Aforementioned examples may be combined. In some embodiments, steps may also be combined. Any suitable order of steps may be used.

Verifying the user before allowing the user to book transportation services may deter users from committing crimes when using the transportation services, which may increase the overall safety of the transportation services. Additionally, by taking a live selfie of the user and verifying the frame taken of the user with other database parameters may increase the accuracy of the static image being a genuine face (i.e., not from a photo or a video or not covered by a mask). Also, if a crime has been committed, the static photo of the user stored in the server may be used to assist authorities in their investigations.

While the invention has been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed:

1. A method of verifying a user for transportation purposes, comprising:
   receiving, from a communication device operated by a user, a request from the user to book a transportation service;
   determining, by a server device, that the user requires verification prior to booking the transportation service and that a valid image of the user is required and that no image of the user is on file with the transportation service, wherein the verification process includes processing to ensure a valid image of the user is captured, the verification process including operating the communication device to
   obtain a video of a face of the user;
   extract a frame and image parameters associated with the frame from the video to use as an image;
   prompt the user to accept the image or retake another image;
   transmit the image and the image parameters to the server device after acceptance by the user;
   determining, by the server device, whether the image is a genuine face by comparing the image parameters of the image with parameters in a database, wherein the parameters in the database include parameters identifying at least one of (i) common locations of facial features and (ii) common distances of facial features from each other, to obtain a comparison result;
   using the comparison result to determine, by the server device, if the user is verified;
   storing the image in a database associated with the server device for future reference; and
   permitting the user to book the transportation service if it is determined that the user is verified.

2. The method of claim 1, further comprising:
   prompting the user to perform a specific action; and
   validating that the specific action is performed by the user.

3. The method of claim 2, wherein the specific action is a head action.

4. The method of claim 2, wherein validating that the specific action is performed by the user comprises capturing multiple frames from the specific action.

5. The method of claim 4, wherein validating that the specific action is performed by the user comprises comparing a position of the face of the user in each frame of the multiple frames to determine if the specific action is performed.

6. The method of claim 2, further comprising:
   instructing the user to position the face of the user in a specific position.

7. The method of claim 1, wherein the database stores at least a first threshold value, wherein the method further comprises:
   comparing the comparison result with the at least first threshold value to obtain a verification result; and using the verification result to determine if the user is verified.

8. The method of claim 1, wherein determining whether the image is a genuine face comprises checking whether the image is from a photo or a video.

9. The method of claim 1, wherein prior to obtaining a video of the face of the user, the server device conducts a preliminary check on the user.

10. The method of claim 9, wherein the preliminary check comprises determining at least one of (i) whether the user is a new user, and (ii) whether the user has completed other forms of verification.

11. A system configured to verify a user for transportation purposes, the system comprising:
a database; and
a processor in communication with the database;
the processor configured to:
receive, from a communication device operated by a user, a request from the user to book a transportation service;
determine that the user requires verification prior to booking the transportation service and that a valid image of the user is required and that no image of the user is on file with the transportation service, wherein the verification process includes processing to ensure a valid image of the user is captured, the verification process including operating the communication device to
obtain a video of a face of the user;
extract a frame and image parameters associated with the frame from the video to use as an image;
prompt the user to accept the image or retake another image;
transmit the image and the image parameters to a server device after acceptance by the user;
determine whether the image is a genuine face by comparing the image parameters of the image with parameters in the database, wherein the parameters in the database include parameters identifying at least one of (i) common locations of facial features and (ii) common distances of facial features from each other, to obtain a comparison result;
use the comparison result to determine if the user is verified;
store the image in a database for future reference; and
permit the user to book the transportation service if it is determined that the user is verified.

12. The system of claim 11, wherein operating the communications device further comprises:
prompting the user to perform a specific action; and
validating that the specific action is performed by the user.

13. The system of claim 11, wherein the database stores at least a first threshold value, wherein the processor is further configured to:
compare the comparison result with the at least first threshold value to obtain a verification result; and
use the verification result to determine if the user is verified.

14. The system of claim 11, wherein determining whether the image is a genuine face comprises operating the processor to check whether the image is from a photo or a video.

15. The system of claim 11, wherein the processor is further configured to conduct a preliminary check on the user prior to obtaining the video from the communication device.

16. The system of claim 15, wherein the preliminary check includes determining at least one of (i) whether the user is a new user, and (ii) whether the user has completed other forms of verification.

17. A communication system configured to verify a user for transportation purposes, the communication system comprising:
a server; and
a communication apparatus in communication with the server, the communication apparatus comprising a memory and a processor in communication with the memory, the processor configured to:
receive, from a communication device operated by a user, a request from the user to book a transportation service;
determine that the user requires verification prior to booking the transportation service and that a valid image of the user is required and that no image of the user is on file with the transportation service, wherein the verification process includes processing to ensure a valid image of the user is captured, the verification process including operating the communication device to
obtain a video of a face of the user;
extract a frame and image parameters associated with the frame from the video to use as an image;
prompt the user to accept the image or retake another image;
transmit the image and the image parameters to the server after acceptance by the user;
determine whether the image is a genuine face by comparing the image parameters of the image with parameters in a database, wherein the parameters in the database include parameters identifying at least one of (i) common locations of facial features and (ii) common distances of facial features from each other, to obtain a comparison result;
use the comparison result to determine if the user is verified;
store the image in a database for future reference; and
permit the user to book the transportation service if it is determined that the user is verified.

18. The communication system of claim 17, wherein operating the communications device further comprises:
prompting the user to perform a specific action; and
validating that the specific action is performed by the user.

19. The communication system of claim 18, wherein validating that the specific action is performed by the user comprises capturing multiple frames from the specific action.

20. The communication system of claim 19, wherein validating that the specific action is performed by the user comprises comparing a position of the face of the user in each frame of the multiple frames to determine if the specific action is performed.

21. The communication system of claim 18, wherein the processor is further configured to instruct the user to position the face of the user in a specific position prior to instructing the user to perform the specific action.

\* \* \* \* \*